United States Patent
Hofmeister

(10) Patent No.: US 7,424,404 B2
(45) Date of Patent: Sep. 9, 2008

(54) METHOD FOR DETERMINING THE ENVELOPE CURVE OF A MODULATED SIGNAL IN TIME DOMAIN

(75) Inventor: Martin Hofmeister, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 18 days.

(21) Appl. No.: 10/525,638

(22) PCT Filed: Aug. 7, 2003

(86) PCT No.: PCT/EP03/08792

§ 371 (c)(1),
(2), (4) Date: Feb. 24, 2005

(87) PCT Pub. No.: WO2004/034712

PCT Pub. Date: Apr. 22, 2004

(65) Prior Publication Data

US 2006/0155493 A1     Jul. 13, 2006

(30) Foreign Application Priority Data

Sep. 12, 2002   (DE) .............................. 102 42 333

(51) Int. Cl.
G06F 15/00   (2006.01)
H03F 1/26    (2006.01)
H04B 15/00   (2006.01)

(52) U.S. Cl. ..................... 702/190; 702/76; 702/77; 324/76.19

(58) Field of Classification Search ................ 702/77, 702/76, 190; 250/339.08; 370/210; 382/280; 379/406.12, 406.13, 406.14, 406.15; 704/203; 324/76.19, 76.12
See application file for complete search history.

(56) References Cited

U.S. PATENT DOCUMENTS 4,209,672 A * 6/1980 Nitta et al. .................... 381/59
4,827,516 A * 5/1989 Tsukahara et al. ........... 704/224

(Continued)

FOREIGN PATENT DOCUMENTS

DE          33 38 193 A1      5/1985

(Continued)

OTHER PUBLICATIONS

Goeckel et al., 'Increasing Diversity with Non-standard Signal Sets in Wireless OFDM Systems', 1999, IEEE Publication, pp. 20-24.*

(Continued)

*Primary Examiner*—Edward Raymond
*Assistant Examiner*—Elias Desta
(74) *Attorney, Agent, or Firm*—Marshall, Gerstein & Borun LLP

(57) ABSTRACT

The disclosure relates to a method for determining the envelope curve of a modulated input signal with the following method steps:
  generating digital samples by digital sampling of the input signal,
  generating Fourier-transformed samples by Fourier transforming the digital samples,
  generating sideband-cleaned, Fourier-transformed samples ($B'_n$) by removing a range with negative frequencies or a range with positive frequencies from the Fourier-transformed samples ($B_n$),
  generating inverse-transformed samples by inverse Fourier transforming the sideband-cleaned, Fourier-transformed samples and
  forming the absolute value of the inverse-transformed samples.

18 Claims, 2 Drawing Sheets

U.S. PATENT DOCUMENTS

| | | | | |
|---|---|---|---|---|
| 5,469,127 | A | 11/1995 | Hulick et al. | 332/149 |
| 5,956,372 | A * | 9/1999 | Vaman et al. | 375/260 |
| 6,272,172 | B1 | 8/2001 | Deshpande et al. | 375/228 |
| 6,314,146 | B1 | 11/2001 | Tellado et al. | 375/346 |
| 6,323,412 | B1 * | 11/2001 | Loo | 84/636 |
| 6,636,048 | B2 * | 10/2003 | Sciacero et al. | 324/520 |
| 2002/0114270 | A1 * | 8/2002 | Pierzga et al. | 370/208 |

FOREIGN PATENT DOCUMENTS

| | | |
|---|---|---|
| DE | 199 10 902 A1 | 10/1999 |
| DE | 101 30 943 A1 | 11/2002 |
| EP | 1 113 637 A2 | 7/2001 |

OTHER PUBLICATIONS

Jelinek et al., 'Frequency-Domain Spectral Envelope Estimation for Low Rate Coding of Speech', Jan. 2000, UOS Publicaiton, pp. 1-4.*

Reveyrand et al., 'A Calibration Time Domain Envelope Measurement System for the Behavioral Modeling of Power Amplifiers', Jan. 2000, IRCOM, pp. 1-4.*

Bonada, 'Automatic Technique in Frequency Domain for Near-Lossless Time-Scale Modification of Audio', 1999, IUA Publication, pp. 1-4.*

"Measuring Peak and Average Power of Digitally Modulated Advanced Television Systems", Rhodes et al., IEEE Transactions on Broadcasting, vol. 38, No. 4, Dec. 1992, pp. 197-201.

"Measuring Peak/Average Power Ratio of the Zenith/AT&T DSC-HDTV Signal with a Vector Signal Analyzer", Sgrignoli et al., IEEE Transactions on Broadcasting, vol. 39, No. 2, Jun. 1993, pp. 255-264.

International Search Report in PCT/EP03/08792 dated Dec. 9, 2003.

International Preliminary Examination Report in PCT/EP03/08792 dated Aug. 27, 2004.

* cited by examiner

METHOD FOR DETERMINING THE ENVELOPE CURVE OF A MODULATED SIGNAL IN TIME DOMAIN

This is the U.S. national phase of International Application No. PCT/EP03/08792 filed Aug. 7, 2003, the entire disclosure of which is incorporated herein by reference.

BACKROUND OF THE DISCLOSURE

1. Field of the Disclosure

The disclosure relates to a method for determining the envelope curve of a modulated signal, for example for determination of the values for a CCDF diagram.

2. Related Technology

The determination of the envelope curve of a modulated signal is required in particular for determination of the CCDF (Complementary Cumulative Distribution Function) but also for other applications. The CCDF diagram indicates the probability that the signal level of the envelope curve of the analyzed signal exceeds a specific level value. From the course of the CCDF diagram, the parameter of the crest factor inter alia can be determined, which parameter indicates the ratio of the power occurring at the maximum in the signal relative to the average power. The crest factor assists the operator of a modulated high frequency transmitter to determine the optimal modulation of the transmitter amplifiers. On the one hand, the transmitted power is intended to be as high as possible in order that the signal-to-noise ratio at the receivers is as large as possible. On the other hand, the transmitting power must not be too large in order to avoid destruction due to short power peaks in the transmission amplifiers. If the measured CCDF course together with the course of an idea signal is represented, conclusions can be made with respect to non-linearity and limitation effects in the transmitted signal.

A measurement value detecting device and display device for a CCDF diagram is known from DE 199 10 902 A1. There also, a step of signal processing resides in determining the envelope curve of the modulated signal or the power of the envelope curve. In column 10, line 47 to column 11, line 28, it is proposed for determining the envelope curve power to sample the signal with the quadruple symbol frequency, to square the digital values of a group comprising four samples, to summate and then to divide by 4. Hence, a sliding average value of the power values of the instantaneous amplitude of the modulated signal is produced, which corresponds to a low-pass filtering. It is however disadvantageous in this mode of operation that the thereby necessary squaring of the sampled digital values leads to higher-frequency spectral components. The subsequent non-ideal low-pass filtering leads to imprecisions in the CCDF measurement. More precisely, the squaring of the samples leads to higher-frequency spectral components which are no longer removed correctly by means of averaging (=filtering with a filter with sin(x)/x frequency response).

SUMMARY OF THE DISCLOSURE

The disclosure provides a method for determining the envelope curve of a modulated signal which operates with a relatively high precision.

According to the disclosed method, the envelope curve of a modulated input signal is determined by:

generating sideband-cleaned Fourier-transformed samples by removing a range with negative frequencies or a range with positive frequencies from the Fourier-transformed samples, generating inverse-transformed samples by inverse Fourier transforming the sideband-cleaned, Fourier-transformed samples and forming values of the absolute value of the inverse-transformed samples.

In contrast to the known method, determination of the envelope curve is effected not by low-pass filtering but instead the digital samples are Fourier-transformed in the frequency range. In the frequency range, the range of positive frequencies or the range of negative frequencies is then removed. Then a Fourier inverse transform in the time domain follows. Only then are the values of the inverse-transformed samples formed. The absolute value of the inverse-transformed sample represents the envelope curve of the modulated high frequency signal.

In contrast to the value formation and subsequent low-pass filtering, the disclosed method has the advantage that implementation of the method is independent of the quality of the low-pass filtering, is independent of the type of signal and its spectral position, and in addition independent of the synchronization state of the high frequency signal to be measured. The disclosed method is in addition substantially more precise than the known method with low pass filtering.

It is advantageous, in addition to the range of negative or positive frequencies, also to remove the level component at the DC frequency zero after the Fourier transform in the frequency range. It is ensured as a result that the direct voltage offset of a non-ideal analog/digital converter has no influence on the disclosed method. The idea signal has no direct voltage component in the intermediate frequency plane so that removal of the direct voltage component does not falsify the measurement result.

Furthermore, it is sensible to further process the samples, which are inverse-transformed in the time domain, only in such a limited range that the cyclic continuation of the signal, which is caused by the Fourier transform and inverse Fourier transform, is suppressed.

Also disclosed are a corresponding digital storage medium, computer program or computer program product based on the disclosed method.

DETAILED DESCRIPTION OF THE PREFFERED EMBODIMENTS

The disclosed method is explained below for the application example for determining the instantaneous power of the envelope curve for a CCDF diagram. As already explained, the method is not restricted to this application and is suitable for all applications in which the instantaneous level of the envelope curve or signal values derived from the latter, such as e.g. the power, i.e. the square of the level, are required.

Figure 2:
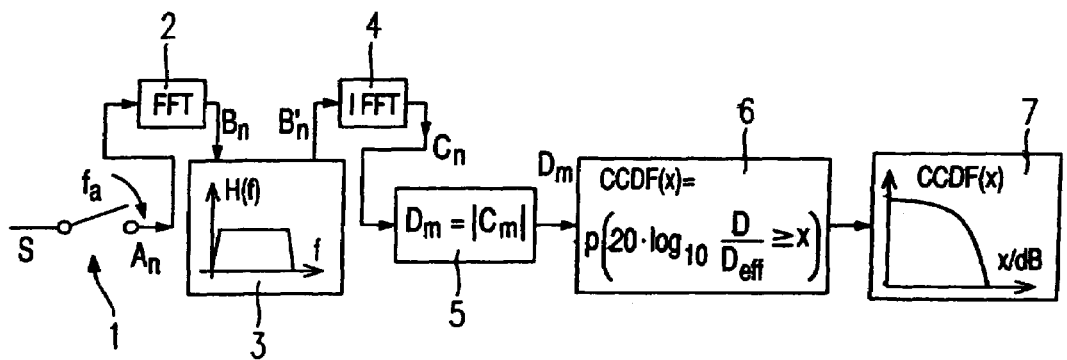
FIG. 2 shows a block diagram of the disclosed method.

FIG. 2 demonstrates the method by means of a block diagram. The high-frequency input signal S, which is modulated by a modulation signal, is firstly sampled digitally on a sampling and holding circuit 1. Digital samples $A_n$ of the input signal S are thereby produced. The samples $A_n$ are then subjected to a Fourier transform for example with an algorithm of the fast Fourier transform (FFT, Fast Fourier Transform). The Fourier-transformed samples $B_n$ are produced as a result. The Fourier transform is illustrated in FIG. 2 by block 2.

Due to the Fourier transform of a sampled real signal, Fourier-transformed samples are produced as is known, which samples extend both over the range of negative frequencies and over the range of positive frequencies. According to the method, either the range of negative frequencies or the range of positive frequencies is removed from the Fourier-transformed samples $B_n$. If the index n is running, which indexes the Fourier-transformed samples $B_n$, for example from $-2^N/2$ to $2^N/2$, N being a whole natural number, then the range of negative frequencies corresponds to the samples $B_n$ with n <0 or the range of positive frequencies corresponds to the samples $B_n$ with n>0.

The remaining samples, which are either only positive or only negative, are designated in FIG. 2 with $B'_n$. Trimming of the samples in the negative frequency range is illustrated in FIG. 2 by the block 3 which has a transfer function H(f) which is different from 0 only in the range of positive frequencies. These sideband-cleaned, Fourier-transformed samples $B'_n$ are subsequently transformed back in the time domain by an inverse Fourier transform. Likewise, a fast digital Fourier inverse transform (IFFT, Inverse Fast Fourier Transform) can be used, which is illustrated in FIG. 2 by block 4. In the time domain, the inverse-transformed samples $C_n$ are present, the value of which is still to be formed finally in the value former 5. The value of the samples, which are inverse-transformed in the time domain, is designated in FIG. 2 with $D_m$.

In the case of application of the CCDF diagram, there must now be established in a block 6 the relative frequency with which the square of the value-samples $D^2_m$, which corresponds to the power, exceeds a threshold value x in relation to the average power $D^2_{eff}$ on a logarithmic scale which is scaled in dB. Expediently, the squaring is implemented not before but after logarithmizing, i.e. instead of a multiplication by the factor 10, a multiplication by the scaling factor 20 is effected:

$$10 \cdot \log \frac{D_m^2}{D_{eff}^2} = 10 \cdot \log \left(\frac{D_m}{D_{eff}}\right)^2 = 20 \cdot \log \frac{D_m}{D_{eff}} \tag{1}$$

The CCDF diagram can then be displayed on a display device 7, for example a screen.

Figure 5:
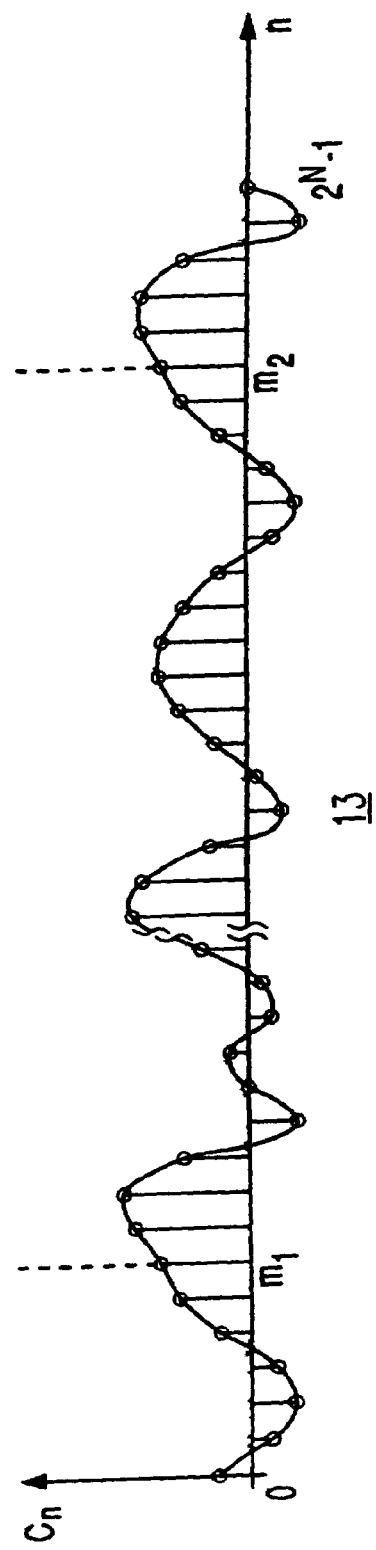

As FIG. 5 shows, the signal, which is initially Fourier-transformed and then inverse-transformed in the time domain, said signal comprising the digital samples $C_n$, is cyclic due to the final time and frequency sampling, i.e. in the example illustrated in FIG. 5, the signal has a cycle length $m_2 - m_1 - 1$. The index n runs in FIG. 5 from 0 to $2^N - 1$. It is therefore expedient to further process the inverse-transformed samples $C_n$ only in a limited range 13 so that the cyclic continuation is suppressed, i.e. there applies $C_m = C_n$ with $m_1 \leq m \leq m_2$. The amount value is calculated only from this limited section $C_m$ of the inverse-transformed samples, which corresponds to the description in FIG. 2. The value formation is then effected according to the formula $$D_m = |C_m| = \sqrt{Re\{C_m\}^2 + Im\{C_m\}^2} \tag{2}$$

The steps for determining the values of the inverse-transformed samples $D_m$ are repeated until a sufficient number of values $D_m$ is available such that the effective value $D_{eff}$ of the value sequence can be determined therefrom according to known rules. The power of this effective value is then the reference value for the indication of the level on the horizontal axis of the CCDF diagram (0 dB). On the vertical axis of the CCDF diagram, the CCDF value, which belongs to the respective power level, is plotted, i.e. that relative frequency with which the power value x relative to the average power $D^2_{eff}$ is exceeded. This is effected by means of the formula $$CCDF(x) = p\left(20 \cdot \log_{10} \frac{D}{D_{eff}} \geq x\right)[x] = dB \tag{3}$$

with
p: probability of occurrence or relative frequency
D: instantaneous value of the envelope curve
$D_{eff}$: effective value of the envelope curve Instead, as here, of comparing level dimensions or voltage dimensions, of course also the corresponding power dimensions (instantaneous power $D^2$ and average power $D_{eff}^2$) are related directly to each other. Then the pre-factor of the logarithm does however change from 20 to 10.

The function of the disclosed method is described in more detail with reference to FIGS. 3 and 4. The signal S can be factorized in a Fourier sequence, i.e. any arbitrary input signal can be constructed from a series of cosine signals with different signal levels and phases. In the following, only one of these Fourier components is considered, which can be written in general as follows:

$$s_1(t) = A(t) \cdot \cos(\omega t + \varphi) \tag{4}$$

The envelope curve to be determined here would therefore be A(t). The transmission signal concerns a real signal which can be represented complexly as follows:

$$s_1(t) = A(t) \cdot \left[\frac{1}{2} \cdot (e^{j \cdot (\omega \cdot t + \varphi)} + e^{-j \cdot (\omega \cdot t + \varphi)})\right] \tag{5}$$

$$= \frac{A(t)}{2} \cdot e^{j \cdot (\omega \cdot t + \varphi)} + \frac{A(t)}{2} e^{-j \cdot (\omega \cdot t + \varphi)}$$

Figure 3:
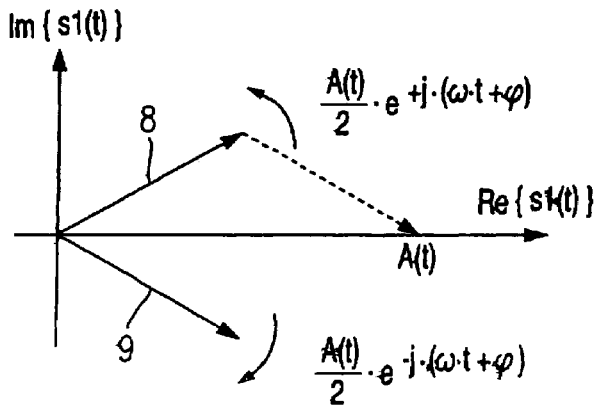
FIG. 3 shows a diagram to explain the mode of operation of the disclosed method.
Figure 4:
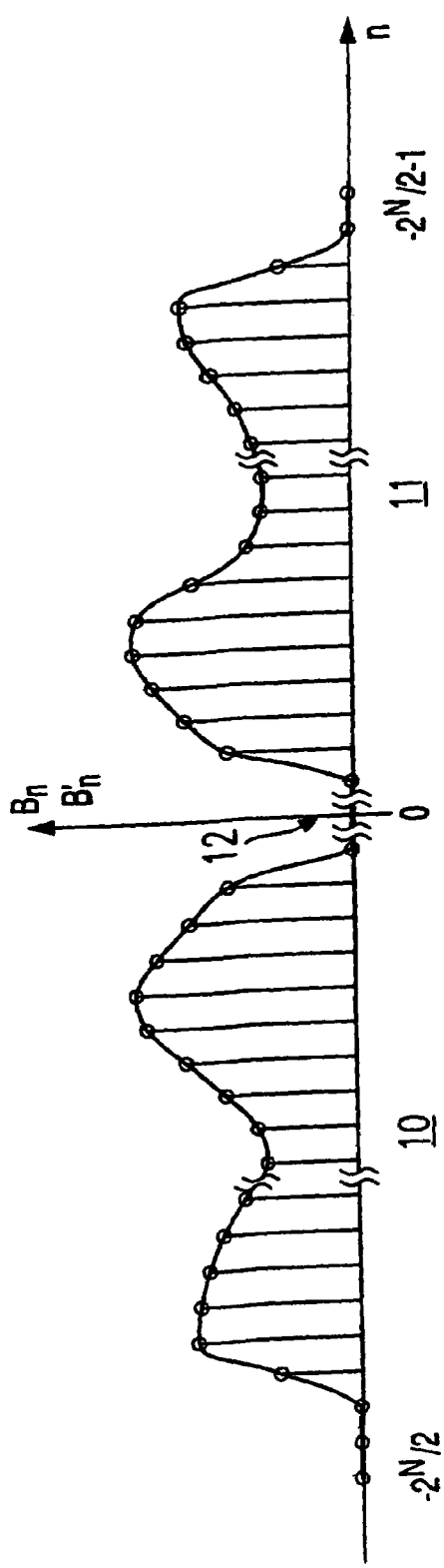
FIG. 4 shows the samples which are Fourier-transformed in the frequency range and FIG. 5 shows the samples which are inverse-transformed in the time domain.

This relation can be presented graphically by means of a vector diagram, as illustrated in FIG. 3.

The signal $s_1$ (t) compromises a first rotating vector 8, which rotates to the left with the angle frequency ù, and a second rotating vector 9 synchronized thereto which rotates to the right with the same circular frequency ù. The omission of the range of negative frequencies leads to the fact that the rotating vector 9 is suppressed. In reverse, omission of the range of positive frequencies, which is just as possible as an alternative, leads to the fact that the rotating vector 8 is suppressed. Filtering in the frequency range leads therefore to omission of one of the two terms in equation (5). If for example the component with the negative frequency; i.e. the rotating vector 9 which rotates to the left in FIG. 3, is omitted in equation (4), then the following result is produced after the amount formation:

$$s_2(t) = \left|\frac{A(t)}{2} \cdot e^{+j(\omega \cdot t + \varphi)}\right| = \left|\frac{A(t)}{2} \cdot e^{-j(\omega \cdot t + \varphi)}\right| = \frac{|A(t)|}{2} \tag{6}$$

The value corresponds according to FIG. 3 to the length of the remaining vector. When using the signal $s_2$ (t) for determining the CCDF diagram, the fact that $s_2$ (t) can only be positive because of the value formation, is of no importance. In the case of the CCDF diagram, powers are compared with each other which can only be positive. The division by the factor 2 does not likewise influence the result of the CCDF diagram.

The knowledge obtained above by means of a Fourier component can of course be applied readily to the total signal which represents a linear superposition of a multiplicity of Fourier components. For this purpose, the Fourier-transformed samples $B_n$ are represented in FIG. 4. The index n runs here from $-2^N/2$ to $2^N/2-1$. It is detectable that the range of negative frequencies 10, in the case of a real input signal S, is the mirror. image of the range 11 with positive frequencies.

If either the range 10 of negative frequencies is omitted in the further signal processing, i.e.
$B'_n=0$ for n<0 and
$B'_n=B_n$ for n>0 or if the region 11 of positive frequencies is omitted, i.e.
$B'_n=B'_n$ for n<0 and
$B'_n=0$ for n>0, then the envelope curve is automatically produced after inverse transformation in the time domain after formation of the absolute value, as was illustrated previously with reference to FIG. 3.

Expediently, not only either the range 10 of negative frequencies or the range 11 of positive frequencies is suppressed, but in addition also the level component 12 for the zero frequency; in the indexation used here, i.e. $B_0$ with n=0. Thus a possibly present direct voltage component (DC-offset) is suppressed. Since the evaluated signals stem from the intermediate frequency plane, these should actually contain no direct voltage component. If, however a direct voltage component is present, then this stems for example from a direct voltage offset of the analog-digital converter and removal of this direct voltage component increases the measurement precision.

Figure 1:
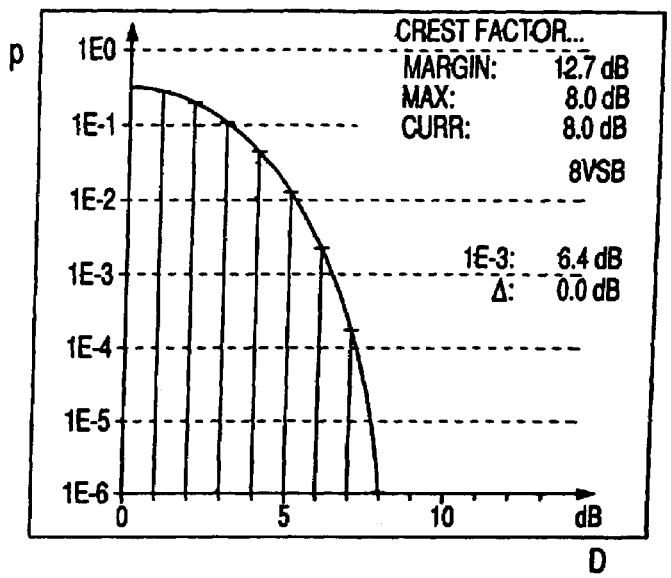
FIG. 1 shows an example of a CCDF diagram.

An example of a CCDF diagram, the underlying envelope curve of which was obtained with the disclosed method, is illustrated in FIG. 1. As already mentioned, the relative frequency p is plotted for this purpose in a CCDF diagram such that s specific level D on a logarithmic scale is exceeded. In the example illustrated in FIG. 3 of an input signal which has been modulated digitally according to the 8VSB standard, exceeding the effective power with 3 dB occurs still with a relative frequency of approximately 10%, whilst, exceeding the effective power with more than 6 dB occurs already with a relative frequency significantly smaller than 1%.

As already mentioned, the disclosed method is not restricted to the application case for determining instantaneous level values or instantaneous power values for a CCDF diagram, but in general is suitable for determining the envelope curve of a modulated signal. The method can be implemented both with digital hardware, for example by using FPGA (Free Programmable Gate Array), or with software in a special processor, ideally in a digital signal processor (DSP).

The invention claimed is:

1. Method for determining an envelope curve of a modulated input signal comprising:
   generating digital samples by digitally sampling a modulated input signal in the time-domain,
   generating Fourier-transformed samples by Fourier transforming the digital samples,
   generating sideband-cleaned, Fourier-transformed samples by removing all negative frequency samples or all positive frequency samples from the Fourier-transformed samples and further removing a level component at a zero frequency,
   generating inverse-transformed samples by inverse Fourier transforming the sideband-cleaned, Fourier-transformed samples,
   calculating the absolute values of the inverse-transformed samples, and
   displaying an envelope curve in the time domain of the modulated input signal based on the absolute values of the inverse-transformed samples.

2. Method according to claim 1, comprising calculating the logarithms of the absolute values of the inverse-transformed samples relative to an effective value of the inverse-transformed samples.

3. Method according to claim 2, comprising displaying the frequency distribution of the logarithms as a function of a logarithmized level (complementary cumulative distribution function diagram).

4. Method according to claim 1, comprising processing the inverse-transformed samples further only in such a limited range that a cyclic continuation, which is caused by the Fourier transform and inverse Fourier transform, is suppressed.

5. Method according to claim 1, comprising calculating the logarithms of the absolute values of the inverse-transformed samples relative to an effective value of the inverse-transformed samples.

6. Method according to claim 5, comprising displaying the frequency distribution of the logarithms as a function of a logarithmized level (complementary cumulative distribution function diagram).

7. The method of claim 1 further comprising the step of:
   processing the inverse-transformed samples further only in such a limited range that a cyclic continuation, which is caused by the Fourier transform and inverse Fourier transform, is suppressed.

8. Method according to claim 7, comprising calculating the logarithms of the absolute values of the inverse-transformed samples relative to an effective value of the inverse-transformed samples.

9. Method according to claim 8, comprising displaying the frequency distribution of the logarithms as a function of a logarithmized level (complementary cumulative distribution function diagram).

10. A computing apparatus comprising:
   a display unit that is capable of generating video images;
   a processing apparatus operatively coupled to the display unit, the processing apparatus comprising a processor and a memory operatively coupled to the processor, the processing apparatus being programmed to:
   generate digital samples by digital sampling a modulated input signal in the time-domain,
   generate Fourier-transformed samples by Fourier transforming the digital samples,
   generate sideband-cleaned, Fourier-transformed samples comprising removing all negative frequency samples or all positive frequency samples from the Fourier-transformed samples and further removing a level component at a zero frequency,
   generate inverse-transformed samples by inverse Fourier transforming the sideband-cleaned, Fourier-transformed samples,
   calculate the absolute values of the inverse-transformed samples, and output to the display unit an envelope curve in the time-domain of the modulated input signal based on the absolute values of the inverse-transformed samples.

11. The apparatus of claim 10, comprising calculating the logarithms of the absolute values of the inverse-transformed samples relative to an effective value of the inverse-transformed samples.

12. The apparatus of claim 11, comprising displaying the frequency distribution of the logarithms as a function of a logarithmized level (complementary cumulative distribution function diagram).

13. The apparatus of claim 10, comprising processing the inverse-transformed samples further only in such a limited range that a cyclic continuation, which is caused by the Fourier transform and inverse Fourier transform, is suppressed.

14. The apparatus of claim 10, comprising calculating the logarithms of the absolute values of the inverse-transformed samples relative to an effective value of the inverse-transformed samples.

15. The apparatus of claim 14, comprising displaying the frequency distribution of the logarithms as a function of a logarithmized level (complementary cumulative distribution function diagram).

16. The apparatus of claim 10, further comprising processing the inverse-transformed samples further only in such a limited range that a cyclic continuation, which is caused by the Fourier transform and inverse Fourier transform, is suppressed.

17. The apparatus of claim 16, comprising calculating the logarithms of the absolute values of the inverse-transformed samples relative to an effective value of the inverse-transformed samples.

18. The apparatus of claim 17, comprising displaying the frequency distribution of the logarithms as a function of a logarithmized level (complementary cumulative distribution function diagram).

* * * * *